T. E. DROHAN.
CLAMP.
APPLICATION FILED NOV. 11, 1916.

1,279,297.

Patented Sept. 17, 1918.

Inventor:
Thomas E. Drohan,
by
His Attorney.

UNITED STATES PATENT OFFICE.

THOMAS E. DROHAN, OF SCHENECTADY, NEW YORK, ASSIGNOR TO GENERAL ELECTRIC COMPANY, A CORPORATION OF NEW YORK.

CLAMP.

1,279,297.      Specification of Letters Patent.      Patented Sept. 17, 1918.

Application filed November 11, 1916. Serial No. 130,893.

*To all whom it may concern:*

Be it known that I, THOMAS E. DROHAN, a citizen of the United States, residing at Schenectady, county of Schenectady, State of New York, have invented certain new and useful Improvements in Clamps, of which the following is a specification.

The present invention relates to clamps, as pipe clamps, and particularly to clamps such as comprise, for example, a strap against which the pipe or other object is fastened by means of a member having threaded ends which project through openings in the strap and receive suitable nuts. Heretofore it has not been feasible to make the straps of such clamps out of punched material, as steel, owing to the fact that they would bend when the clamp was tightened beyond a certain point thus limiting the force by which the pipe or other object could be gripped.

The object of the present invention is to provide an improved clamp of the type referred to which may be made from sheet material, as sheet steel, by means of punching and which will not bend no matter how tight it may be clamped. A further object is to provide such a structure in a clamp that the strap may be punched from relatively thin material, thereby rendering it economical of material and cheap to manufacture.

For a consideration of what I believe to be novel and my invention, attention is directed to the accompanying specification and the claims appended thereto.

Figure 1:
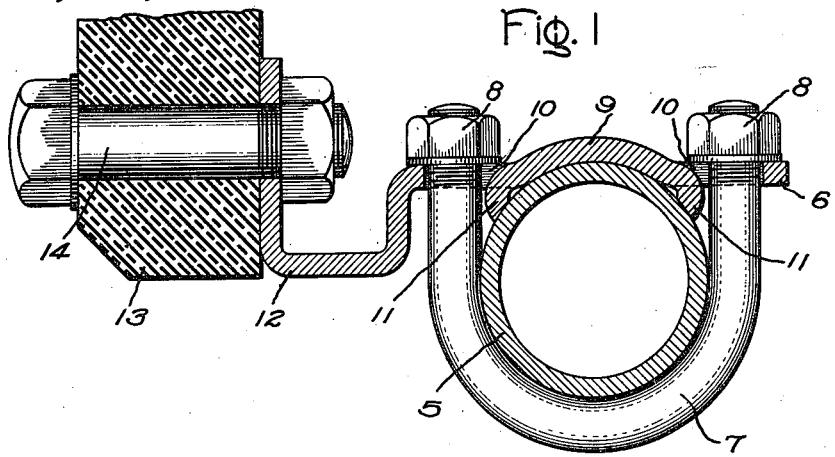
Figure 2:
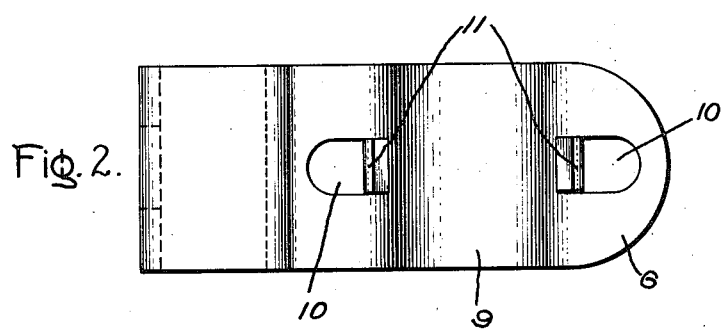
Figure 3:
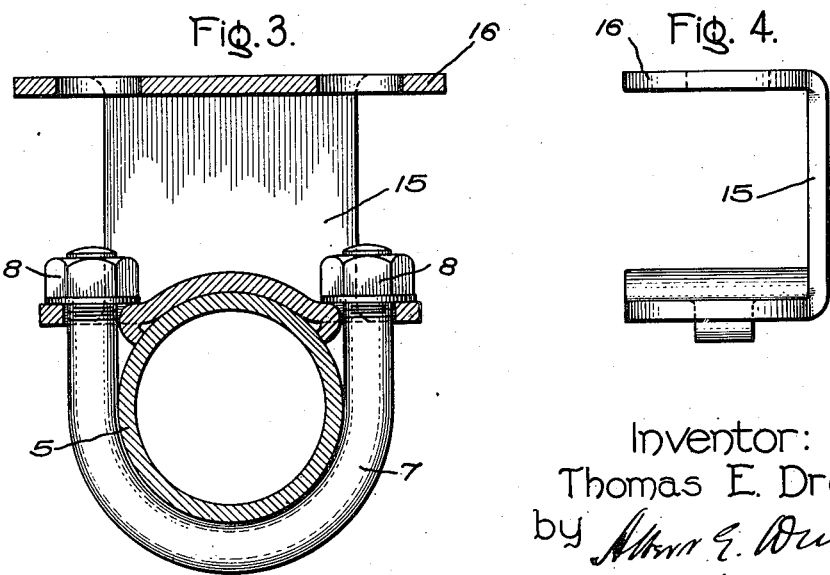

In the accompanying drawings, Figure 1 is a side elevation, partly in section of a clamp embodying my invention; Fig. 2 is a bottom plan view of the strap; Fig. 3 is a view similar to Fig. 1 of a modification, and Fig. 4 is a side elevation of the strap of Fig. 3.

Referring to the drawing, 5 indicates an object to be clamped, as a pipe, 6 the strap of a clamp, and 7 the U-shaped member which surrounds the object 5 with its two ends projecting through openings in the strap and threaded to receive nuts 8. The strap comprises a slightly rounded central portion 9 which conforms to the contour of the object to be clamped, and on each side of which is punched an opening 10 through which the ends of the member 7 project.

The material punched from the openings 10 is turned inward to form lugs 11, which are adapted to take against the surface of the object to be clamped and preferably adjacent the upper portion thereof as shown. The arrangement is such that the lugs 11 lie beneath the heads of the nuts 8. By this arrangement when the nuts are tightened the lugs 11 engaging the sides of the pipe 5 prevent the ends of the strap from bending around the pipe. Formed integral with the strap 6 is a bracket portion 12 by means of which the strap may be fastened to a support, as indicated at 13, a suitable bolt 14 being used in the present instance.

Figure 4:
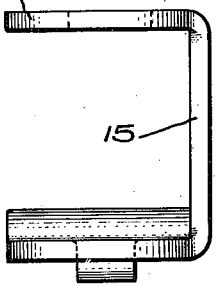

The arrangement shown in Figs. 3 and 4 is the same as that shown in Figs. 1 and 2, except that the bracket portion of the strap is of a different form adapting the clamp for use in a different position. In this case the bracket comprises the section 15 at right angles to the strap and the section 16 parallel thereto.

It will be understood that the invention may be used in connection with clamps of various forms and adapted for various uses, the particular feature of the invention being the lugs 11 which are located under the heads of the clamping nuts and which engage the object to be clamped and prevent the strap from bending.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by any other means.

What I claim as new and desire to secure by Letters Patent of the United States, is:—

1. In a clamp of the character described, a strap punched from sheet material and having an opening punched therein, the material punched out to form the opening being turned to form a lug adapted to engage a side of the object to be clamped, a member adapted to engage the object to be clamped, and provided with a threaded end which projects through said opening, and a nut on said threaded end which overlaps the lug.

2. In a clamp of the character described, a strap punched from sheet material and provided with two spaced openings, the material punched out to form the openings being turned to form two lugs adapted to engage the sides of an object to be clamped, a member adapted to engage the object to be clamped and provided with threaded ends which project through said openings, and nuts on said threaded ends which overlap the lugs.

In witness whereof, I have hereunto set my hand this 10th day of November, 1916.

THOMAS E. DROHAN.